United States Patent

Lee

[11] Patent Number: 5,618,094
[45] Date of Patent: Apr. 8, 1997

[54] PROJECTION SYSTEM

[75] Inventor: Dong-Hee Lee, Seoul, Rep. of Korea

[73] Assignee: Daewoo Electronics Co., Ltd., Seoul, Rep. of Korea

[21] Appl. No.: 601,976

[22] Filed: Feb. 15, 1996

[30] Foreign Application Priority Data

Feb. 15, 1995 [KR] Rep. of Korea .................. 95-2725

[51] Int. Cl.⁶ .................. G03B 21/00; G02B 15/14
[52] U.S. Cl. ........................... 353/101; 359/694
[58] Field of Search .................. 353/31, 37, 94, 353/101, 100; 359/694, 695, 696, 703

[56] References Cited

U.S. PATENT DOCUMENTS

| | | | |
|---|---|---|---|
| 4,607,924 | 8/1986 | Varce | 353/101 |
| 4,679,069 | 7/1987 | Andrea et al. | 353/37 |
| 4,961,635 | 10/1990 | Kondo et al. | 350/429 |
| 5,045,930 | 9/1991 | Hasegawa | 353/101 |
| 5,125,733 | 6/1992 | Lee | 353/7 |
| 5,305,029 | 4/1994 | Yoshida et al. | 353/37 |
| 5,311,227 | 5/1994 | Takayasu et al. | 353/37 |
| 5,465,126 | 11/1995 | Fukuda | 353/101 |

FOREIGN PATENT DOCUMENTS

| | | |
|---|---|---|
| 0071390 | 2/1983 | European Pat. Off. . |
| 0431718 | 6/1991 | European Pat. Off. . |
| 59-131916 | 7/1984 | Japan . |

Primary Examiner—William Dowling
Attorney, Agent, or Firm—Foley & Lardner

[57] ABSTRACT

A projection system has three projecting lenses that are controlled integrally. A holder having an upper plate and a lower plate is provided. A plurality of longitudinally slanted guiding holes are formed at the left and right portions of the upper and lower plate. First, second and third projecting lens holders having cylindrical shapes are provided in the holder housing. Projecting lenses are provided at the front sides of the holders. Movable pins are protrusively formed at the upper and lower portions of the first and third projecting lens holders and are inserted into corresponding longitudinally slanted guiding holes. A holder supporting plate has a first and second holder brackets for supporting the second projecting lens holder, and four leg portions and guiding grooves formed at the leg portions for inserting the movable pins. A driving motor and a transporting apparatus are provided. The image control is advantageous and the keystoning phenomenon is eliminated.

17 Claims, 9 Drawing Sheets

PROJECTION SYSTEM

BACKGROUND OF THE INVENTION

1. Field of the Invention

The present invention relates to a projection system, and more particularly to a projection system in which three projecting lenses can be driven integrally so as to match three beam images on a screen and to focus the images on the screen simultaneously, thereby avoiding a keystoning phenomenon.

2. Description of the Prior Art

Generally, in a three beam splitting-type projection system, three projectors corresponding to red, green and blue colors are placed at predetermined distances away from a screen. A projecting object is projected on a screen through each projector and the images obtained therefrom are overlapped to provide a viewer with a full color image.

In the three beam splitting-type projection system, when the distances between the screen and the projectors and between the projectors themselves are not exactly adjusted, the images projected through the projectors could not be matched.

FIG. 1 is a schematic view of the constitution of a conventional projection system. The system has first, second and third projecting units 1a, 1b and 1c for projecting red, green and blue color beams.

The first, second and third projecting units include first, second and third light sources 4a, 4b and 4c such as xenon lamps, first, second and third spherical reflecting mirrors 3a, 3b and 3c for reflecting the light emitted backwards to the forward direction, first, second and third collimating lenses 5a, 5b and 5c for collimating the forwardly emitted and reflected light and for convening the collimated light into parallel light, first, second and third liquid crystal display (LCD) panels (or slide films) 6a, 6b and 6c, first, second and third projecting lenses 7a, 7b and 7c, etc.

Conventionally, first, second and third projecting units 1a, 1b and 1c are driven independently to adjust the reproduced image on a screen S1. That is, a first image is obtained on screen S1 by moving the focus of the image of one projecting unit among the three projecting unit, vertically and laterally. Then, a complete image is obtained by moving the remaining projecting units vertically and laterally.

In the three beam splitting-type projection system, in case the images projected on screen S1 through each projecting unit do not coincide or in case the focus of the image is not accurate due to inappropriate distances between the screen and each projecting unit, the projection direction and the projection angle should be adjusted by moving each projecting unit with respect to both the screen and the remaining projecting units to compensate for the deviation.

Accordingly, the operation is very complicated and inconvenient. In addition, since the adjusting operation is implemented manually while staring at the image reproduced on screen S1, an accurate adjustment is very difficult if the operator is not an expert.

Moreover, in the above-mentioned three beam projection system, a second light axis Lb of second projecting unit 1b coincides with a central axis L1 of screen S1, while first and second light axes La and Lc of first and third projecting units 1a and 1c are slanted at a predetermined angle to central axis L1 of screen S1. This generates differences in distances when the lights arrive at the left and the right of screen S1 through projecting lenses 7a and 7c. Accordingly, the ratios of image magnification at the left and the right of the screen become different. Consequently, the projected images obtained through first and third projecting lenses 7a and 7b shows vertical trapezoidal distortion to give three disagreeing images, as shown in FIG. 9A. The appearance of the distortion in the image is called as the keystoning phenomenon.

When employing such a conventional projector in the three beam projection system, a disadvantage of increasing the fatigue of a viewer's eyes in viewing the images due to the generation of the keystoning phenomenon occurs.

U.S. Pat. No. 5,125,733 (issued to Lee) discloses a stereoscopic projector for driving a pair of projecting lens holders integrally as a method for overcoming the above-mentioned problems. In this patent, the light axes of the projecting objects and the light axes of the projecting lenses are parallel to the central axis of the screen to coincide two projected images on the screen, thereby preventing the keystoning phenomenon.

Although a good image without the trapezoidal distortion could be obtained by using the above-mentioned apparatus, the apparatus is complicated and the manufacture thereof is not so advantageous.

SUMMARY OF THE INVENTION

To solve the problems of the conventional art, it is an object of the present invention to provide a novel projection system in which three projecting lenses could be driven integrally, and the operation and the control thereof is very accurate and advantageous, thereby eliminating the keystoning phenomenon and reducing the fatigue of a viewer's eyes.

To accomplish the above object, there is provided in the present invention a projection system comprising a holder housing having an upper plate and a lower plate, where a plurality of longitudinally slanted guiding holes formed at the left and right portions of the upper plate and the lower plate form angles with respect to the central lines of the upper plate and the lower plate, a first opening portion is formed at a rear center of and extended to the front side of the upper plate and a second opening portion is formed at a rear center of the lower plate; first, second and third projecting lens holders having cylindrical shapes, being provided with projecting lenses at front sides thereof and being placed in the holder housing; movable pins protrusively formed at the upper and lower portions of the first and third projecting lens holders and inserted into corresponding longitudinally slanted guiding holes; a holder supporting plate having first and second holder brackets formed at the center portion of the holder supporting plate for supporting the second projecting lens holder, first, second, third and fourth leg portions extended to the upper portion of the upper plate and the lower portion of the lower plate through the first and second opening portions, the leg portions being formed at the left and right sides of the holder supporting plate, and guiding grooves formed at the leg portions for inserting the movable pins; a driving motor for imparting driving power to the projecting lens holders; and transporting means for transporting the driving power from the driving motor to the projecting lens holders.

Particularly, screw holes are formed in the movable pins, and the screw holes are screw combined with sliding pins.

A sliding groove preferably is formed at a center of the lower plate along the longitudinal direction of the second projecting lens holder, and corresponding rollers are formed at a lower portion of the second projecting lens holder.

The diameter of the movable pin, width of the longitudinally slanted guiding hole and width of the guiding groove are preferably the same.

The driving motor is preferably fixedly installed on a side of the upper plate of the holder housing and the transporting means includes a worm velocity-reducing gear for reducing the driving power and for transforming the rotational direction to the vertical direction along a pinion.

At this time, a rack gear meshed with the pinion is provided on the second projecting lens holder.

At the side portions of the rack gear, grooves are formed and springs and ball bearings are provided in the grooves to reduce the frictional force between the second projecting lens holder and the holder housing during transportation of the second projecting lens holder so as to facilitate the transportation.

The first and the second holder brackets are combined by screws to the second projecting lens holder to support the holder.

The object of the present invention also could be accomplished by a projection system comprising first, second and third projecting objects and first, second and third projecting lenses, for reproducing an image on a screen by passing light through the projecting objects and the projecting lenses, characterized in that the light axes of the first and third projecting objects, the light axes of the first and third projecting lenses, and a central axis of the screen are parallel.

Particularly, the light axes of the first and third projecting lenses exist between light axes of the first and third projecting objects and the central axis of the screen, respectively.

The three projecting lenses in the projection system according to the present invention could be driven integrally by means of a motor, and therefore, matching of the three beams of red, green, and blue colors and controlling of the image on the screen could be implemented simultaneously, thereby simplifying the operation of each projector, simplifying the adjustment of the images on the screen and removing the keystoning phenomenon.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, the constituting elements and the operation principle of the projection system according to an embodiment of the present invention will be explained in more detail with reference to the accompanying drawings.

Figure 1:
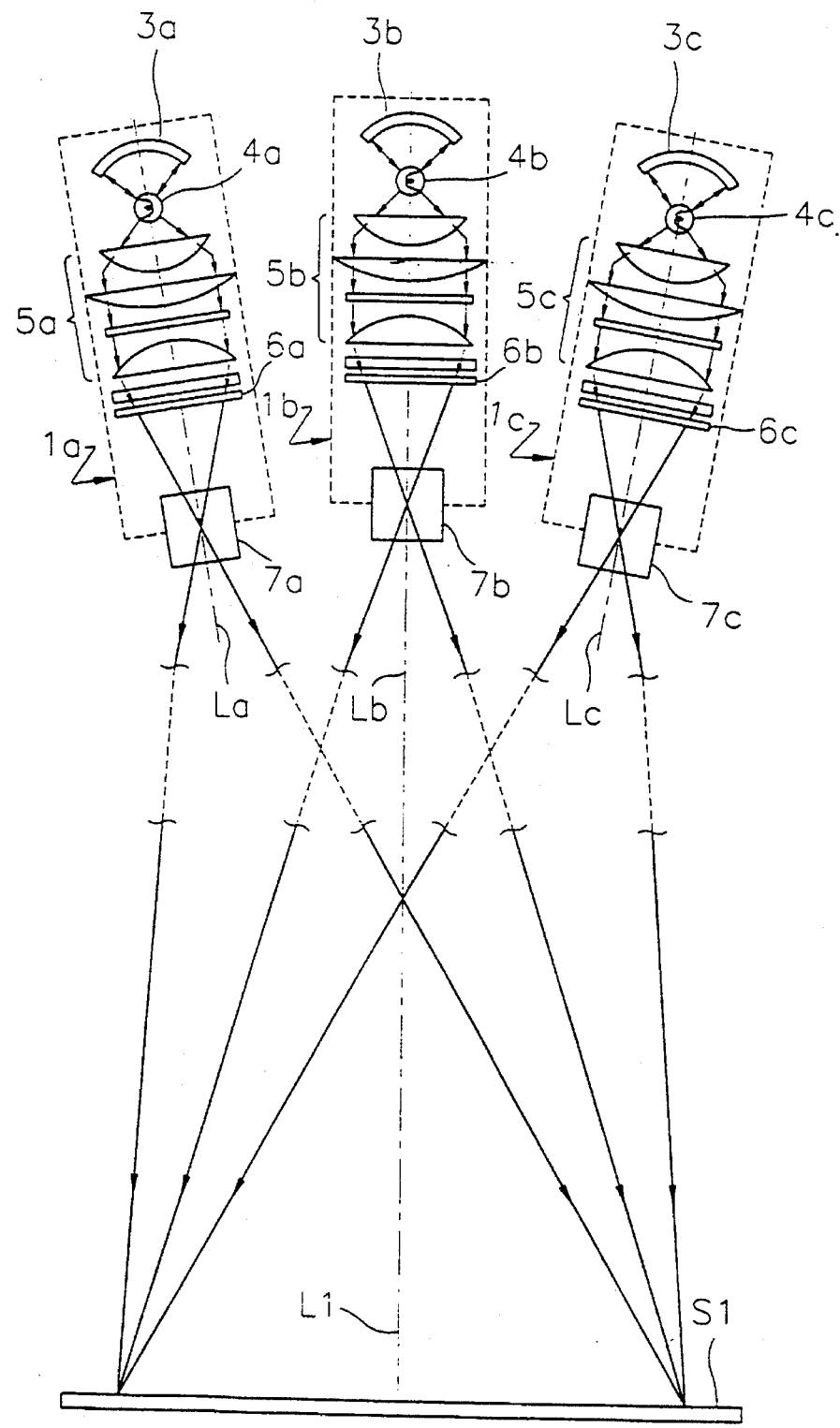
FIG. 1 is a schematic view of the constitution of a conventional projection system.
Figure 2:
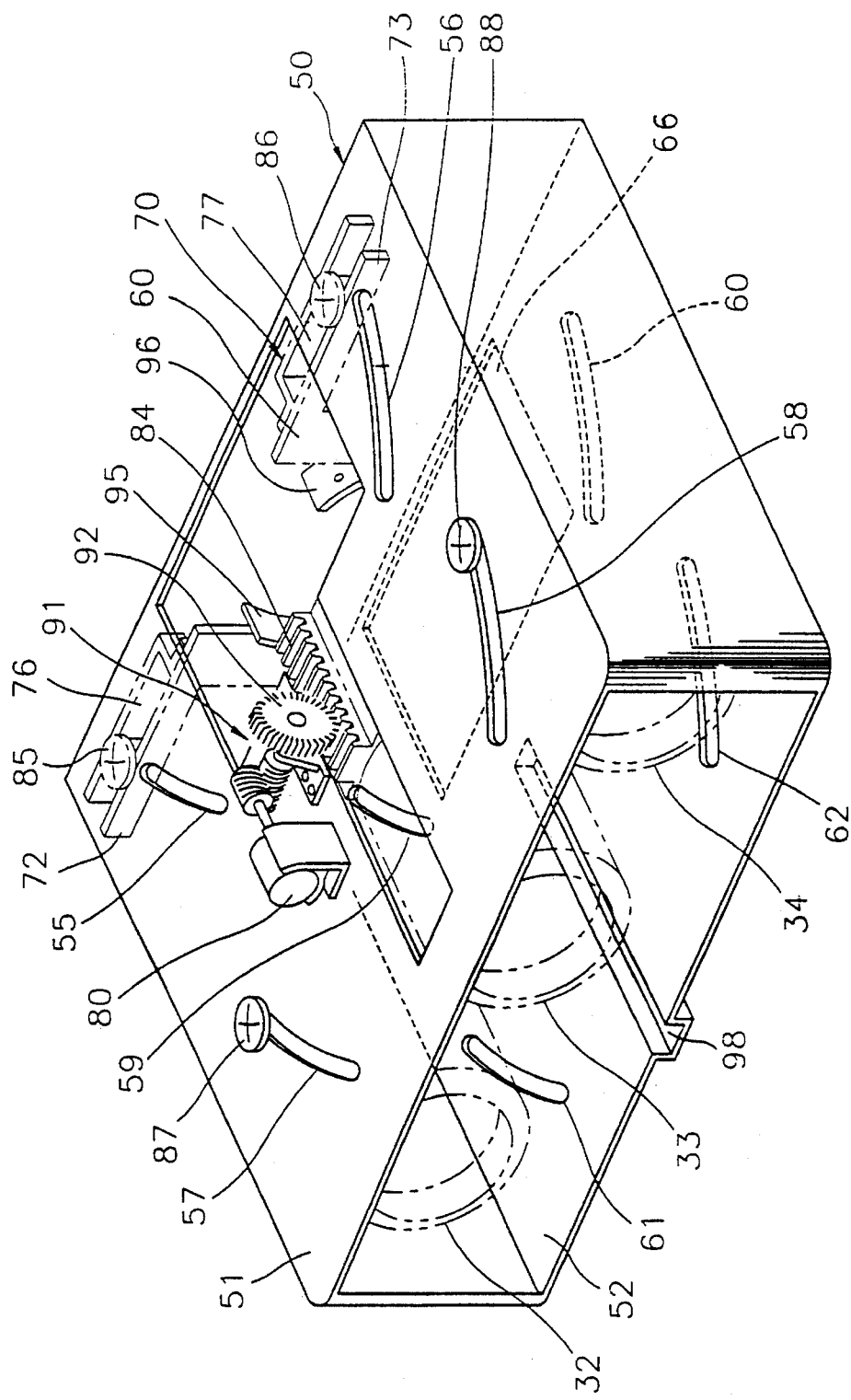
FIG. 2 is a perspective view for schematically showing the constituting elements of the projecting lens driving apparatus of the projection system according to the present invention.
Figure 3:
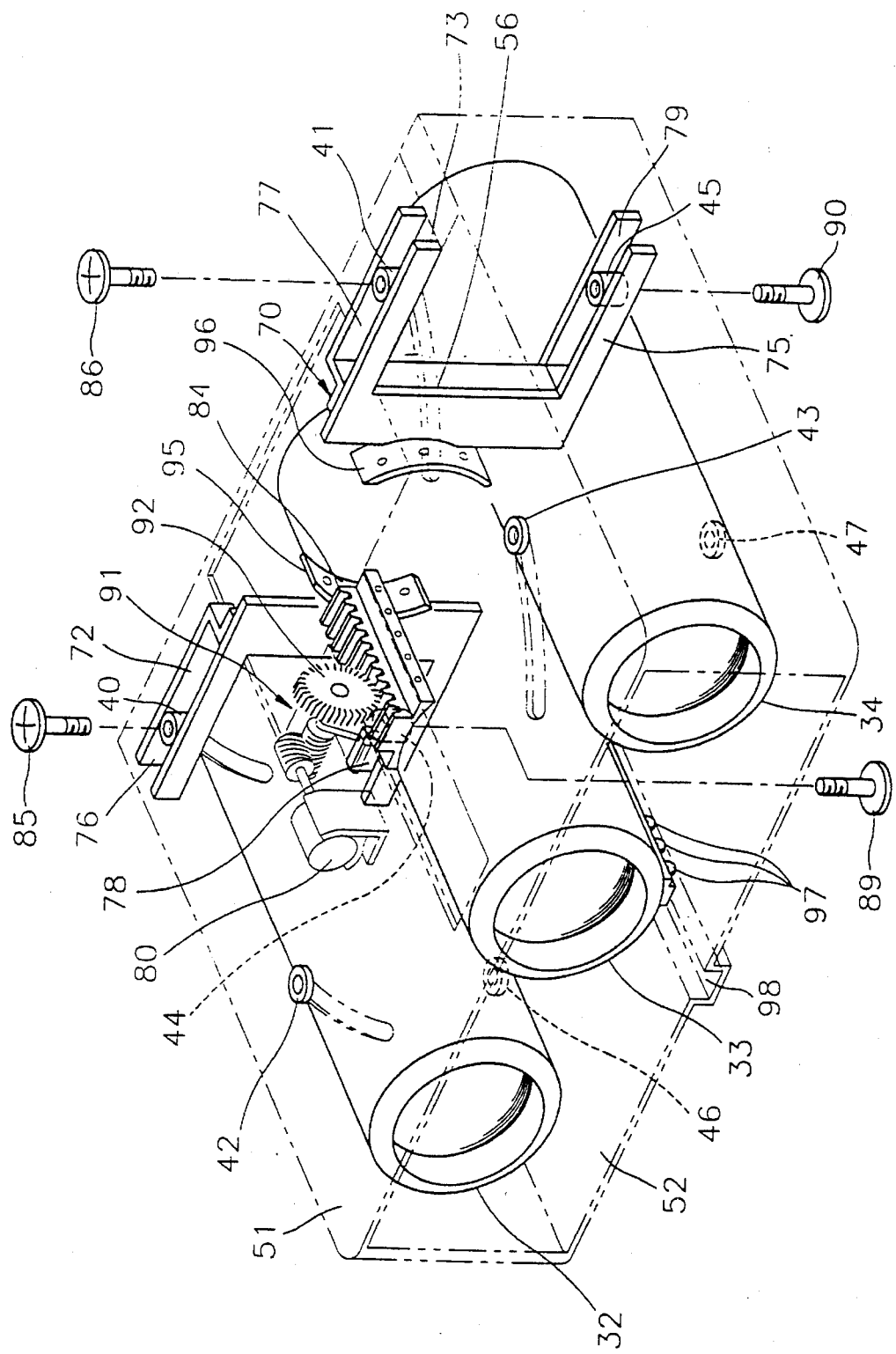
FIG. 3 is a perspective view for showing each constituting element of the projecting lens driving apparatus of the projection system as shown in FIG. 2.

FIG. 2 is a perspective view for schematically showing the constituting elements of the projecting lens driving apparatus of the projection system according to the present invention, and FIG. 3 is a perspective view for showing each constituting element more particularly.

The projecting lens driving apparatus largely includes a holder housing 50 having an upper plate 51 and a lower plate 52, first, second and third projecting lens holders 32, 33 and 34 provided in parallel in holder housing 50, a holder supporting plate 70 for supporting projecting lens holders 32, 33 and 34 and a driving motor 80 for supplying a driving power.

Firstly, a first opening portion 65 and a second opening portion 66 are formed respectively in upper plate 51 and lower plate 52 of holder housing 50, and a plurality of longitudinally slanted guiding holes 55, 56, 57, 58, 59, 60, 61 and 62, which are inclined to a predetermined degree with respect to the central axis of holder housing 50, are formed at both sides of upper plate 51 and lower plate 52. First opening portion 65 is formed in a rectangular shape at the rear central portion of upper plate 51 and is extended forward to a predetermined distance. Second opening portion 66, which has the same size with the portion formed at the rear portion of first opening portion 65, is formed in a rectangular shape at the rear central portion of lower plate 52.

On the upper and lower portions of first and third projecting lens holders 32 and 34, movable pins 40, 41, 42, 43, 44, 45, 46 and 47, which are inserted into corresponding longitudinally slanted guiding holes and are movable within the longitudinally slanted guiding holes, are protrusively formed.

On the upper portion of second projecting lens holder 33, a rack gear 84, which protrudes through first opening portion 65, is formed, and on the lower portion of second projecting lens holder 33, rollers 97 are formed in correspondence with a sliding groove 98 installed along the central line of lower plate 52.

Holder supporting plate 70 has holder brackets 95 and 96 for supporting second projecting lens holder 33 and leg portions 72, 73, 74 and 75. Guiding grooves 76, 77, 78 and 79 into which movable pins 40, 41, 44 and 45 are inserted and transported, are formed at each leg portion 72, 73, 74 and 75. In guiding grooves 76, 77, 78 and 79, movable pins 40, 41, 44 and 45, which have passed through longitudinally slanted guiding holes 55, 56, 59 and 60 are inserted. Accordingly, four movable pins 40, 41, 44 and 45 located at the rear portion protrude higher than four movable pins 42, 43, 46 and 47 located at the front portion from first and third projecting lens holders 32 and 34 by a length of the width of leg portions 72, 73, 74 and 75.

Sliding pins 85, 86, 87, 88, 89 and 90 are combined by screws to movable pins 40, 41, 42, 43, 44 and 45 through screw holes formed at the center of the movable pins. To the remaining movable pins 46 and 47, sliding pins are also combined by screws, although they are not shown. The sliding pins are preferably provided for preventing separation of the movable pins from the longitudinally slanted guiding holes and/or from the guiding grooves.

At a side on the upper portion of upper plate 51, a driving motor 80 and a worm velocity-reducing gear 91 for reducing the rotational velocity of driving motor 80 and for transporting the rotational power to vertical direction, are fixedly installed. At the end of worm velocity-reducing gear 91, a pinion which is meshed with rack gear 84 is provided.

Figure 4:
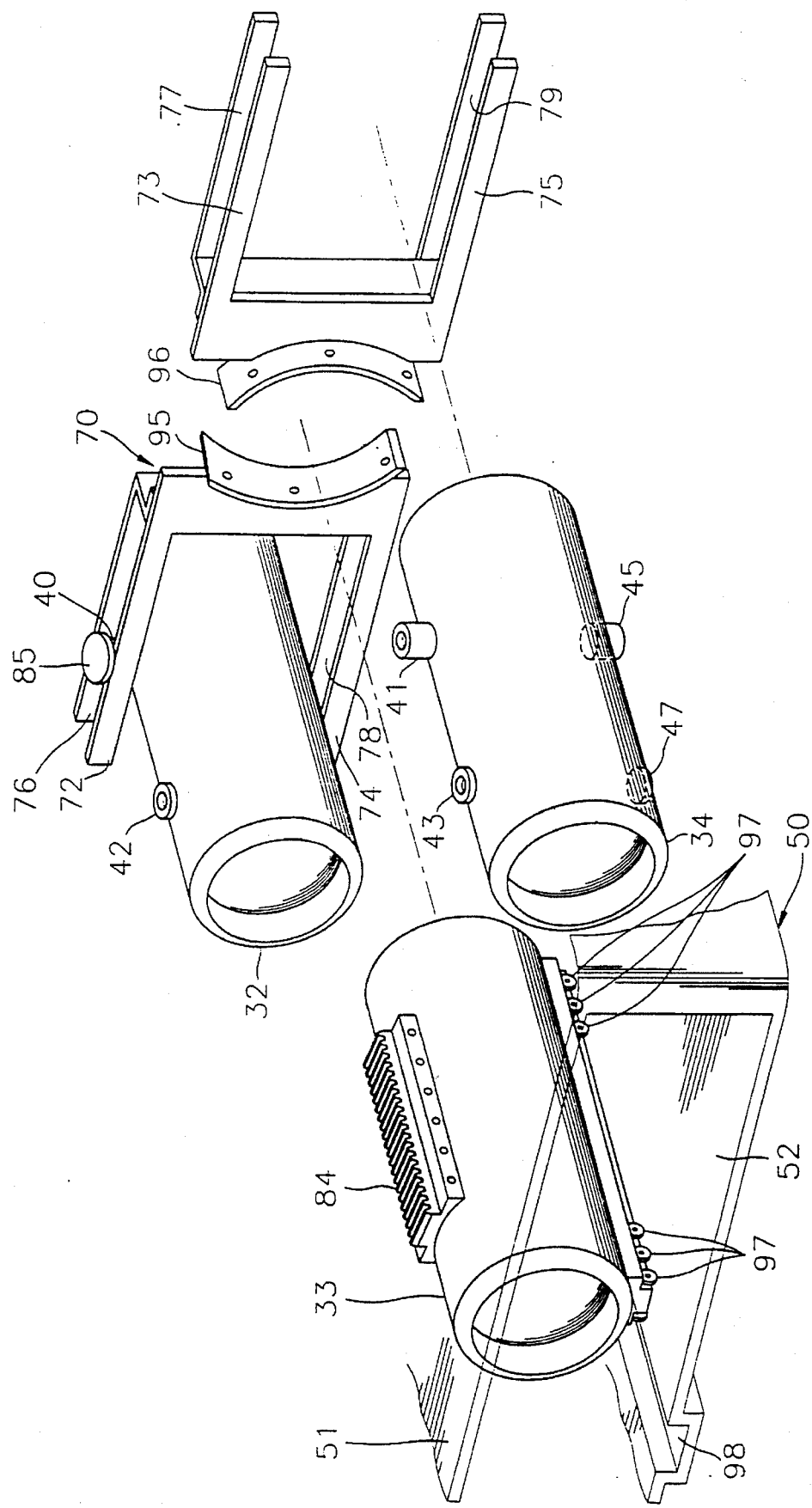
FIG. 4 is a perspective explosion view of the main part of the projecting lens driving apparatus of the projection system according to the present invention.

FIG. 4 is a perspective explosion view of three projecting lens holders 32, 33 and 34 and holder supporting plate 70.

First and third projecting lens holders 32 and 34 are fixed to the leg portions through the media of movable pins 40, 41, 44 and 45 and sliding pins 85, 86, 89 and 90. Second projecting lens holder 33 having rollers 97 at the lower portion thereof is fixed to holder supporting plate 70 through holder brackets 95 and 96 by a method such as a combination by screws.

Figure 5:
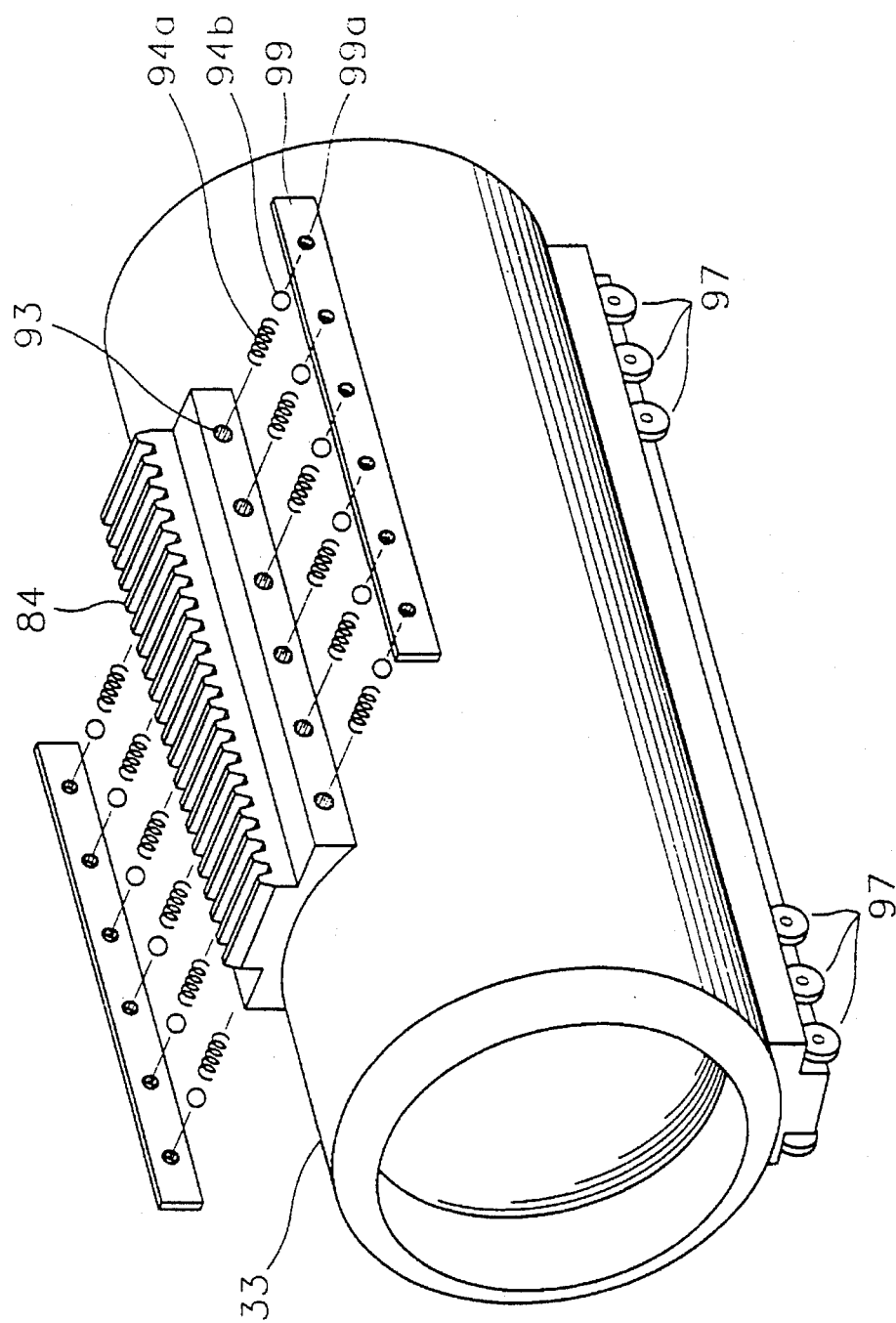
FIG. 5 is a perspective explosion view of the projecting lens holder placed at the center portion of the projection system according to the present invention.

FIG. 5 is a perspective explosion view of the second projecting lens holder having the rack gear attached at the upper portion thereof and having the rollers at the lower portion thereof.

At both sides of rack gear 84, a plurality of grooves 93 are formed and a plurality of springs 94a are inserted thereinto. At the end of springs 94a and at the opposite position of grooves 93, when springs 94a are being put into the center position, ball bearings 94b are combined with springs 94a by means of a combining apparatus. The ball bearings are inserted into a plurality of through holes 99a, which have a diameter smaller than the diameter of ball bearings 94b, and formed at a bearing inserting plate 99 attached to the side surfaces of rack gear 84.

Ball bearings 94b are installed for reducing frictional force between second projecting lens holder 33 and the adjacent portion of holder housing 50 when second projecting lens holder 33 moves. With the rollers 97 formed on the lower portion of second projecting lens holder 33, the ball bearings are installed for advantageous transportation of second projecting lens holder 33.

Figure 6:
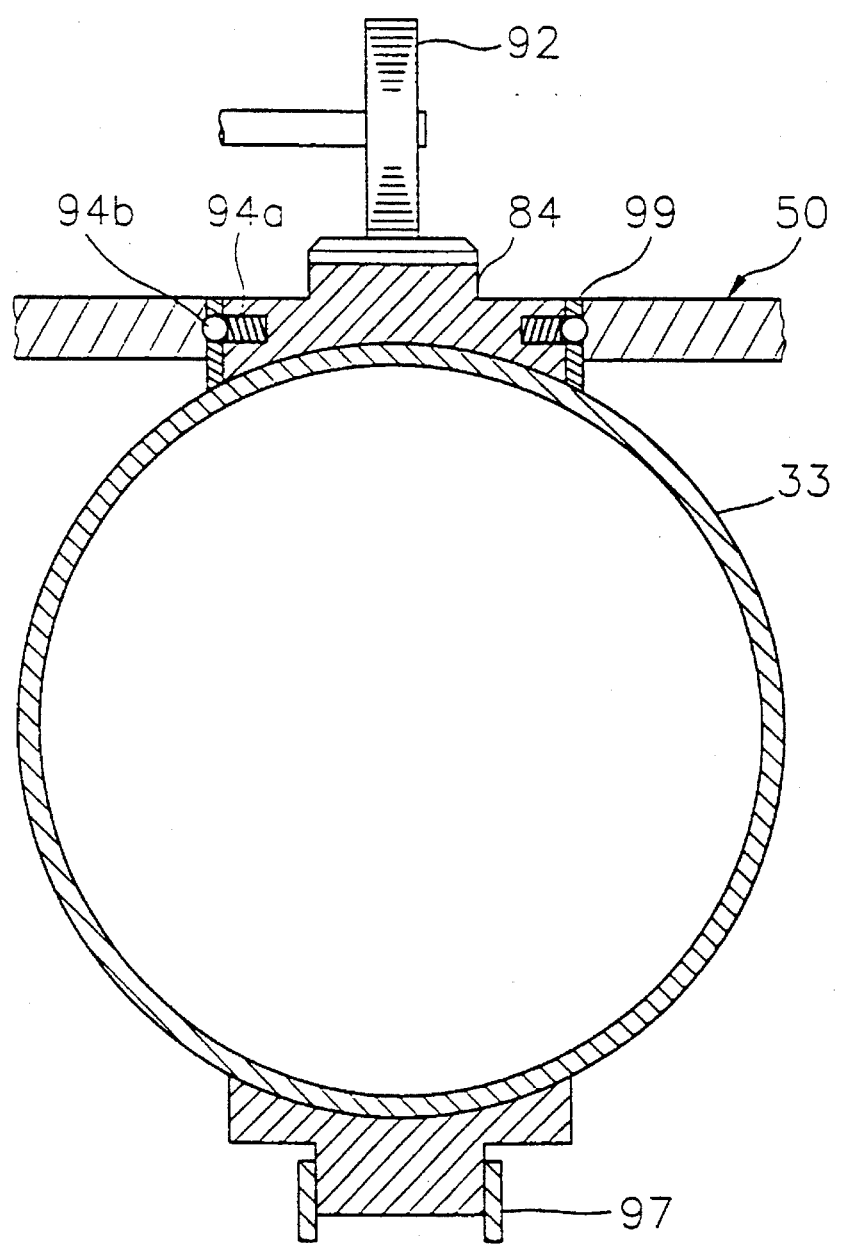
FIG. 6 is a cross sectional view of the projecting lens holder placed at the center portion of the projection system according to the present invention.

FIG. 6 is a cross sectional view of the second projecting lens holder for showing the relation between the rack gear, the holder housing and the pinion.

Rollers 97 are provided on the lower portion of second projecting lens holder 33 and rack gear 84 is formed on the upper portion thereof. Rack gear 84 and pinion 92 are meshed. At the side surfaces of rack gear 84, bearing inserting plates 99 are provided so that they interpose between springs 94a and ball bearings 94b. Beside the bearing inserting plate, holder housing 50 is placed.

Figure 7A:
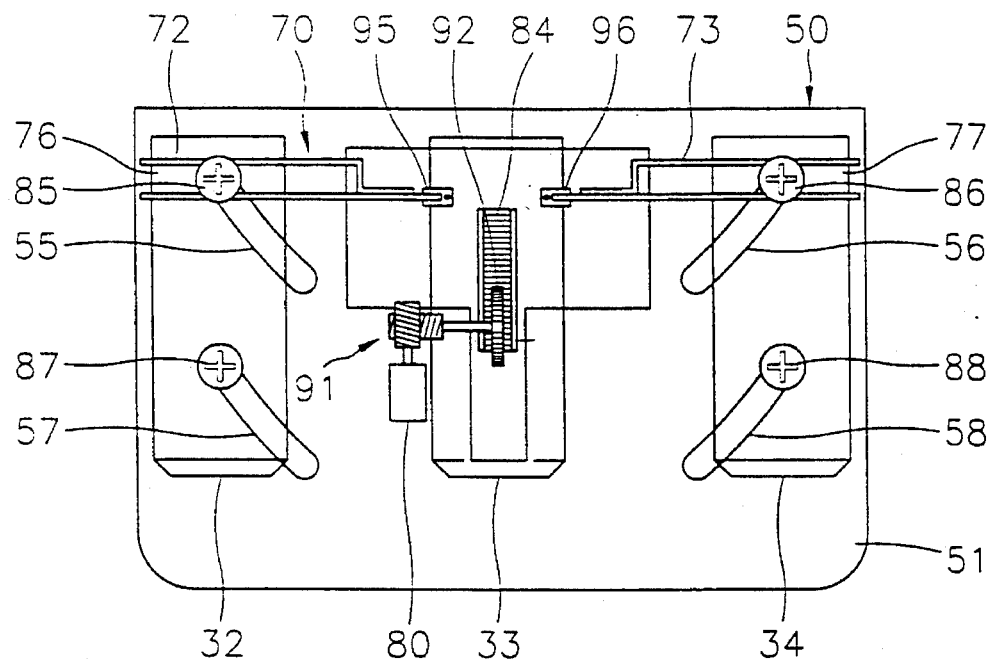
FIG. 7A and FIG. 7B illustrate the operation of the projecting lens driving apparatus of the projection system according to the present invention, wherein FIG. 7A corresponds to the state when each projecting lens holder is transported to the rear end position, while FIG. 7B corresponds to the state when each projecting lens holder is transported to the forefront position.
Figure 7B:
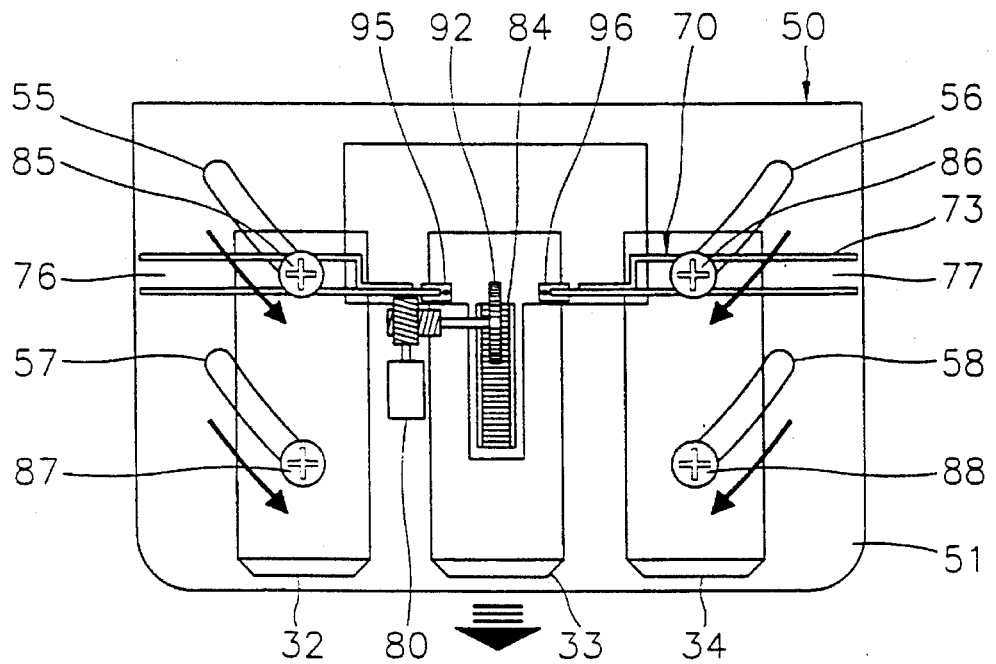

FIG. 7A and FIG. 7B illustrate the operation of the projecting lens driving apparatus of the projection system according to the present invention, wherein FIG. 7A corresponds to the state when each projecting lens holder is transported to the rear end position, while FIG. 7B corresponds to the state when each projecting lens holder is transported to the forefront position.

When the projecting lens holders are at the rear end position, sliding pins 85, 86, 87, 88 are placed at the rear end portions of longitudinally slanted guiding holes 55, 56, 57 and 58, while transporting pinion 92 is placed at the forefront position of rack gear 84. Accordingly, projecting lens holders 32, 33 and 34 are placed at the rear position and at this time, the distances between them are at their maximum.

Then, driving motor 80 starts to drive and pinion 92 rotates to a predetermined direction through the worm velocity-reducing gear. Then, rack gear 84 meshed with pinion 92 starts to move forward and second projecting lens holder 33, holder supporting plate 70, and first and third projecting lens holders 32 and 34 start to move forward. Second projecting lens holder 34 only moves forward, while first and third projecting lens holders 32 and 34 move forward and gather together. This is because the passages of the movable pins formed on first and third projecting lens holders 32 and 34 are restricted by longitudinally slanted guiding holes 55, 56, 57 and 58.

After completing the transportation, projecting lens holders 32, 33 and 34 are positioned at the forefront position and sliding pins 85, 86, 87 and 88 are positioned at the forefront position within longitudinally slanted guiding holes 55, 56, 57 and 58. Transporting pinion 92 is placed at the rear position of rack gear 84. Accordingly, projecting lens holders 32, 33 and 34 are at the forefront position and at this time, the distances between them are at their minimum.

That is, by controlling the driving direction of driving motor 80, the transporting direction of three projecting lens holders 32, 33 and 34 could be determined.

Figure 8:
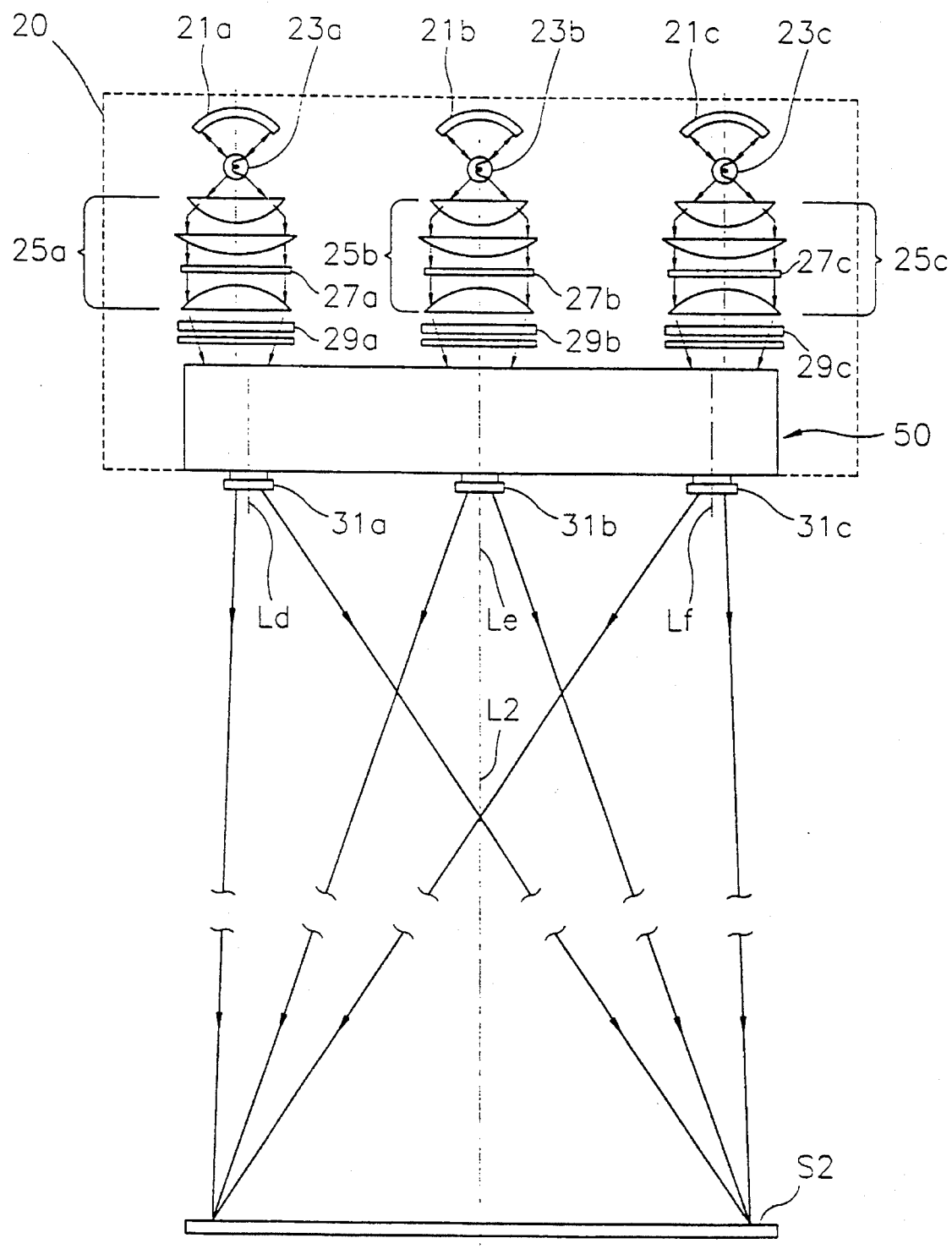
FIG. 8 schematically shows the constitution of the projection system according to the present invention.

FIG. 8 schematically shows the constitution of the projection system according to the present invention.

Within a case 20, three spherical reflecting mirrors 21a, 21b and 21c, light sources 23a, 23b and 23c, collimating lenses 25a, 25b and 25c, heat line absorbing filters 27a, 27b and 27c and projecting objects (LCD panels or slide films) 27a, 27b and 27c are provided. Next, holder housing 50 is provided in which three projecting lens holders having three projecting lenses 31a, 31b and 31c are formed so as to move integrally by means of a driving motor.

In this structure, the three projecting lens holders move forward, backward, and laterally simultaneously, while keeping the light axes of projecting objects 29a, 29b and 29c and the light axes of projecting lenses Ld, Le and Lf parallel to the central axis of a screen S2.

Particularly, when the light axes of first and third projecting lenses Ld and Lf are nearer to the central axis of a screen L2 than the light axes of the projecting objects, the reproduced images on screen S2, which are projected through first and third projecting lenses 31a and 31c, are not distorted in a trapezoidal shape.

Figure 9A:
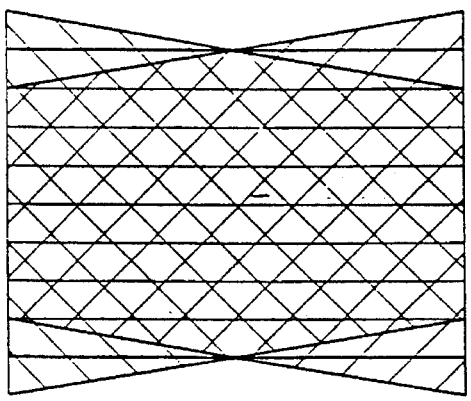
FIG. 9A illustrates images on a screen showing the keystoning phenomenon, attained by using a conventional projection system.
Figure 9B:
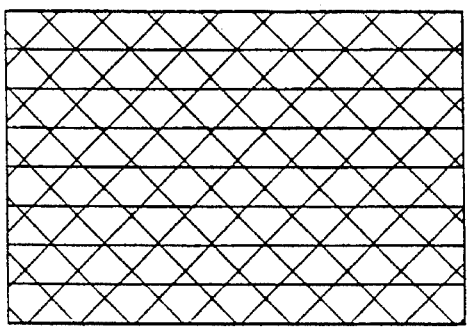
FIG. 9B illustrates images on a screen showing no keystoning phenomenon, attained by using the projection system according to the present invention.

FIG. 9A illustrates images on the screen showing the keystoning phenomenon, attained by using the conventional projection system, and FIG. 9B illustrates images on the screen showing no keystoning phenomenon, attained by using the projection system according to the present invention.

As shown in FIGS. 9A & 9B, the keystoning phenomenon is removed in the projection system according to the present invention.

As described above, image controlling is simple when using the projection system of the present invention and the obtained image is good.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A projection system comprising:

a holder housing having an upper plate and a lower plate, the upper and lower plates each having a plurality of substantially longitudinally slanted guiding holes at left and right portions thereof, wherein the guiding holes form angles with respect to central lines of said upper plate and said lower plate, the upper plate having a first opening portion at a rear center and extending to a front side thereof and the lower plate having a second opening portion at a rear center thereof;

first, second, and third projecting lens holders provided with first, second, and third projecting lenses at front sides thereof and placed in said holder housing;

movable pins at upper and lower portions of said first and third projecting lens holders and situated in corresponding longitudinally slanted guiding holes;

a holder supporting plate having first and second holder brackets formed at a center portion of said holder supporting plate for supporting said second projecting lens holder, first, second, third, and fourth leg portions extending to upper portions of said upper plate and lower portions of said lower plate through said first and second opening portions and formed at left and right sides of said holder supporting plate, and guiding grooves formed at said leg portions and receiving said movable pins;

a driving motor for imparting driving power to said projecting lens holders; and transporting means for transporting the driving power from said driving motor to said projecting lens holders.

2. A projection system as claimed in claim 1, wherein screw holes are formed in said movable pins and receive screws therein.

3. A projection system as claimed in claim 1, wherein a sliding groove is formed at a center portion of said lower plate along a longitudinal direction of said second projecting lens holder and corresponding rollers are formed at a lower portion of said second projecting lens holder.

4. A projection system as claimed in claim 1, wherein a diameter of said movable pin, a width of said longitudinally slanted guiding hole, and a width of said guiding groove are the same.

5. A projection system as claimed in claim 1, wherein said first and second holder brackets are attached to said second projecting lens holder with screws.

6. A projection system as claimed in claim 1, wherein light axes of said first and third projecting lenses provided at each of fronts of said first and third projecting lens holders are parallel to a central axis of a screen.

7. A projection system as claimed in claim 1, wherein said driving motor is fixedly installed on a side of said upper plate of said holder housing.

8. A projection system as claimed in claim 7, wherein said transporting means comprises a worm velocity-reducing gear and a pinion.

9. A projection system as claimed in claim 8, wherein a rack gear meshed with said pinion is provided on said second projecting lens holder.

10. A projection system as claimed in claim 9, wherein grooves are formed at side portions of said rack gear and springs and ball bearings are provided in said grooves.

11. A projection system as claimed in claim 10, wherein a sliding groove is formed at a center of said lower plate along a longitudinal direction of said second projecting lens holder and corresponding rollers are formed at a lower portion of said second projecting lens holder.

12. A projection system as claimed in claim 1, wherein each of said first, second, and third projecting lens holders is cylindrically shaped, and said movable pins are protrusively formed at the upper and lower portions of said first and third projecting lens holders.

13. A projection system comprising:

first, second, and third protecting objects and first, second and third projecting lenses, for reproducing images on a screen by passing light through said projecting objects and said projecting lenses, wherein light axes of said first and third projecting objects, light axes of said first and third projecting lenses, and a central axis of said screen are parallel, and wherein said light axes of said first and third projecting lenses are in between said light axes of said first and third projecting objects and said central axis of said screen, respectively, a holder housing having an upper plate and a lower plate, the upper and lower plates each having a plurality of substantially longitudinally slanted guiding holes at left and right portions thereof, wherein the guiding holes form angles with respect to central lines of said upper plate and said lower plate, the upper plate having a first opening portion at a rear center and extending to a front side thereof and the lower plate having a second opening portion at a rear center thereof;

first, second, and third projecting lens holders, each provided with a projecting lens at a front side thereof, and placed in said holder housing;

movable pins at upper and lower portions of said first and third projecting lens holders and situated in corresponding longitudinally slanted guiding holes;

a holder supporting plate having first and second holder brackets formed at a center portion of said holder supporting plate for supporting said second projecting lens holder, first, second, third, and fourth leg portions extending to upper portions of said upper plate and lower portions of said lower plate through said first and second opening portions and formed at left and right sides of said holder supporting plate, and guiding grooves formed at said leg portions and receiving said movable pins;

a driving motor for imparting driving power to said projecting lens holders; and transporting means for transporting said driving power from said driving motor to said projecting lens holders.

14. A projection system as claimed in claim 13, wherein each of said first, second, and third projecting lens holders is cylindrically shaped, and said movable pins are protrusively formed at the upper and lower portions of said first and third projecting lens holders.

15. A projection system comprising:

a holder housing having an upper plate and a lower plate, the upper and lower plates each having a plurality of substantially longitudinally slanted guiding holes at left and right portions thereof, wherein the guiding holes form angles with respect to central lines of said upper plate and said lower plate, the upper plate having a first opening portion at a rear center and extending to a front side thereof and the lower plate having a second opening portion at a rear center thereof;

first, second, and third projecting lens holders, each provided with a projecting lens at a front side thereof, and placed in said holder housing;

movable pins at upper and lower portions of said first and third projecting lens holders and situated in corresponding longitudinally slanted guiding holes, said pins having screw holes at a center thereof and receiving screws therein;

a holder supporting plate having first and second holder brackets formed at a center portion of said holder supporting plate for supporting said second projecting lens holder, first, second, third, and fourth leg portions extending to upper portions of said upper plate and lower portions of said lower plate through said first and second opening portions and formed at left and right sides of said holder supporting plate, and guiding grooves formed at said leg portions and receiving said movable pins;

a sliding groove formed at a center of said lower plate along a longitudinal direction of said second projecting lens holder and corresponding rollers formed at a lower portion of said second projecting lens holder;

a driving motor for imparting driving power to said projecting lens holders, said driving motor being fixedly installed on a side of said upper plate of said holder housing;

a worm velocity-reducing gear and a pinion for transporting said driving power from said driving motor to said projecting lens holders; and a rack gear formed on said second projecting lens holder and meshed with said pinion, grooves formed at sides of said rack gear and springs and ball bearings provided into said grooves, wherein a diameter of said movable pins, a width of said longitudinally slanted guiding hole and a width of said guiding groove are the same.

16. A projection system as claimed in claim 15, wherein each of said first, second, and third projecting lens holders is cylindrically shaped, and said movable pins are protrusively formed at the upper and lower portions of said first and third projecting lens holders.

17. A projection system as claimed in claim 16 wherein said holder supporting plate is connected to said second projecting lens holder with screws.

* * * * *